Nov. 8, 1966     G. C. GETTELMAN ET AL     3,284,613

FOOD HEATING APPARATUS

Filed Feb. 25, 1964     2 Sheets-Sheet 1

INVENTORS.
GILBERT C. GETTELMAN
MERLIN G. ROSTAD
BY Andrus & Starke
ATTORNEYS

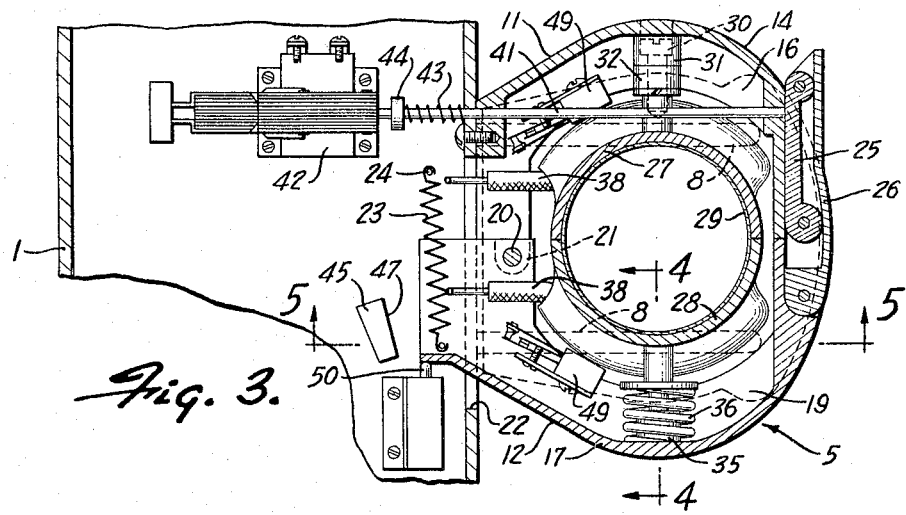
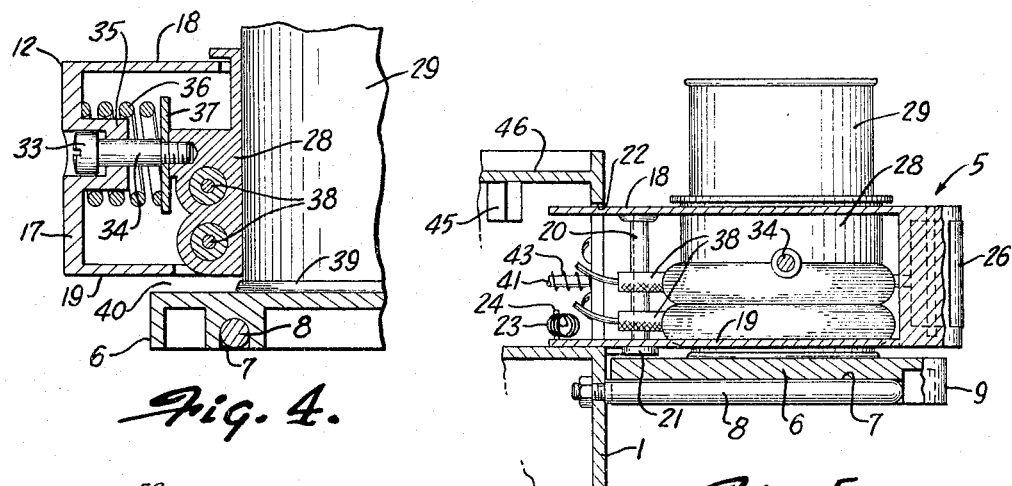
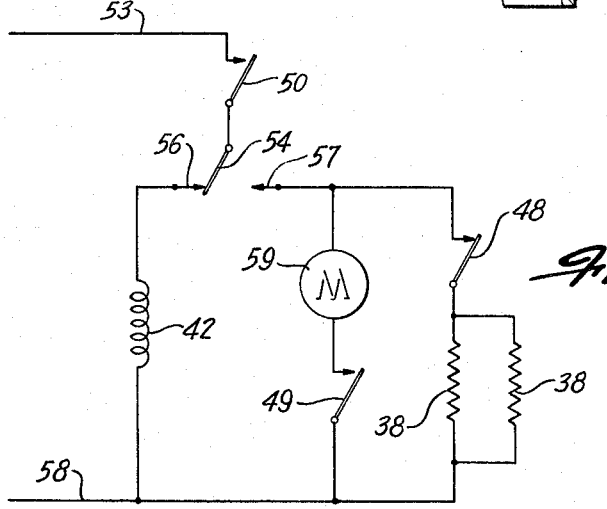

United States Patent Office 3,284,613
Patented Nov. 8, 1966

3,284,613
FOOD HEATING APPARATUS
Gilbert C. Gettelman, 2510 W. Dunwood Road, Glendale, Wis., and Merlin G. Rostad, 317 Evergreen Drive, Cedarburg, Wis.
Filed Feb. 25, 1964, Ser. No. 347,198
2 Claims. (Cl. 219—535)

This invention relates to a heating apparatus and more particularly to a device for heating foods such as soup or the like.

Many restaurants have a unit for displaying and heating canned soup which is sometimes referred to as a "soup kitchen." The unit generally includes a series of shelves containing several varieties of canned soup, a can opener and a heating device for heating the soup. The heating device usually consists of an electrically heated, double-walled cup, and soup is poured from the opened can into the cup and heated. After heating, the soup is poured into a bowl or cup for serving.

As the conventional "soup kitchen" normally includes only one or two heating cups, the cups must be cleaned after each use. However, in some instances, the heating cup is not cleaned at all after use, while in other cases it is not completely cleaned so that contamination and loss of flavor results.

Furthermore, the conventional heating cup occasionally may crack and water may leak into the hollow interior of the cup. Continued heating will boil the water to generate steam and the steam pressure has been known to shatter or explode the double-walled cups. A further problem with the heating cups is that they may occasionally develop hot spots in the heating surface with the result that food or soup in contact with the hot spot will overheat or char.

While the conventional heating cups normally include a timing device so that the heating unit will be shut off after a selected period of heating, the soup or other food will not always be heated to the same temperature. This variation in soup temperature occurs because the timer is sometimes actuated when the cup is cold while other times the timer is actuated when the cup is hot. If the timer is actuated for a given heating period when the cup is already hot, the cup of course will heat the contents to a higher temperature than if the cup is cold at the beginning of the heating period.

The present invention is directed to a device for heating food products, such as soup, in restaurants or eating establishments in which the food product is heated directly in the can without transferring the food product to a heating cup or pan. More specifically, the heating apparatus of the invention includes a can supporting tray or platform on which the opened can is positioned. The can is engaged by a pair of clamping jaws, one of which is movable from an open can-receiving position to a closed can-clamping position. Electric heating elements are associated with the clamping jaws and by energizing the heating elements, heat is transferred directly through the wall of the can to the soup or other food product contained within the can.

The apparatus includes a timing mechanism which can be set for any desired period of heating. In addition, the unit includes two thermostats. The first thermostat is operably connected to the timer so that the timer will begin its timing cycle only after the heating unit has been heated to a predetermined temperature setting. The second thermostat is a safety thermostat which is set at an elevated temperature to prevent overheating of the contents of the can.

The timing mechanism is operably connected to the movable clamping jaw so that when the timing cycle is completed, the jaw will be automatically opened and the heating element will also be de-energized. The can, after heating, will remain between the open jaws so that the contents of the can will remain warm even if the can is not immediately withdrawn from the heating unit.

As an additional feature, the apparatus of the invention includes a dampening mechanism for dampening or decelerating the movement of the movable clamping jaw as it is opened. The dampening action prevents a sudden shock or jar when the jaw opens and thereby prevents the soup from spilling from the can.

By heating the soup or other material directly in the can in which it is contained, the problem of contamination and loss of flavor is eliminated. Moreover, the problems of leaks, explosions and hot spots, which occur with the conventional double-walled heating cup, are eliminated because the soup is heated directly in the single walled can.

The soup will be heated to a uniform temperature in all cases because the timing cycle does not start until the heating unit has reached a predetermined temperature. Moreover, after the timing cycle has been completed, the heating jaws are automatically opened so that overheating due to residual heat will be prevented. Even though the clamping jaws are open, the can remains in proximate relation to the jaws so that the contents of the can will remain warm even though the can is not immediately withdrawn from the heating unit.

Other objects and advantages will appear in the course of the following description.

The drawings illustrate the best mode presently contemplated of carrying out the invention.

Figure 1:
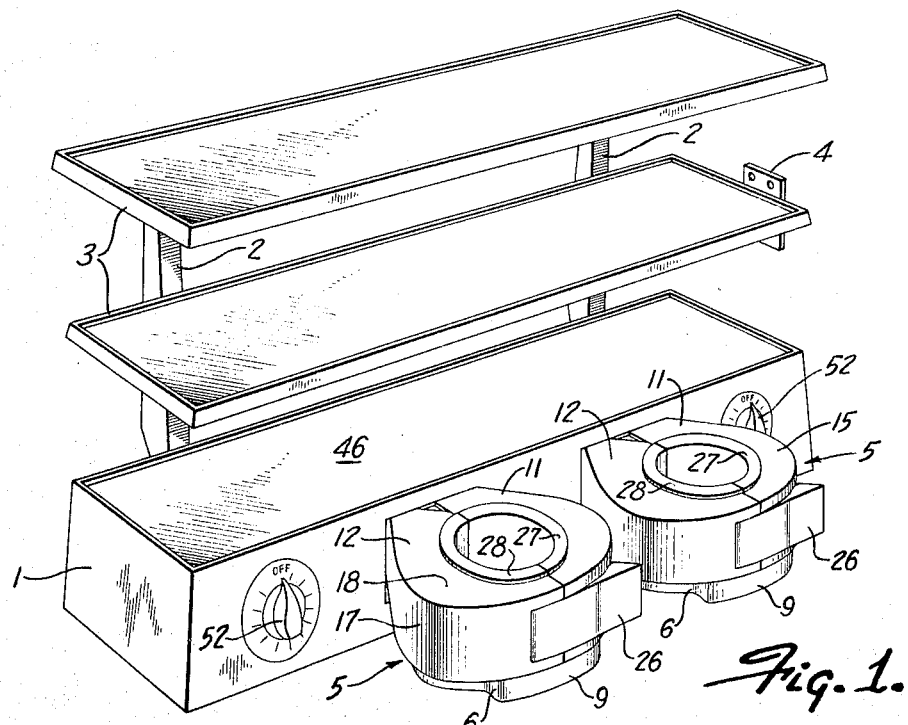
FIG. 1 is a perspective view of the food heating apparatus of the invention.
Figure 2:
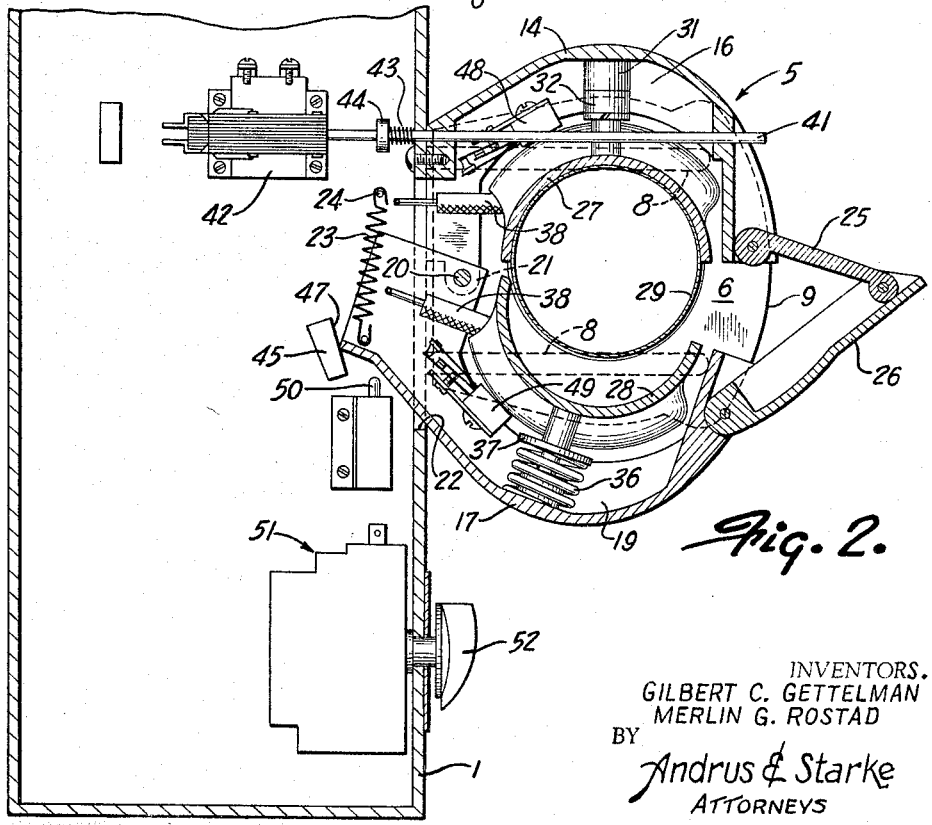
FIG. 2 is a horizontal section showing one of the heating units in an open position.

FIG. 3 in a view similar to FIG. 2 showing the heating unit in the closed position;

FIG. 4 is a vertical section taken along lines 4—4 of FIG. 2;

FIG. 5 is a transverse section taken along line 5—5 of FIG. 2; and

FIG. 6 is a wiring diagram of the heating unit.

The drawings illustrate an apparatus for heating soup or other canned food products that is particularly adapted for use in restaurants or other commercial eating establishments. The apparatus includes a casing or housing 1, and a series of supports 2 extend upwardly from the housing and support member of shelves 3. Cans containing soup or other food products are adapted to be stored on the shelves 3. A bracket 4 is connected to one of the shelves and serves as a mounting for a can opener, not shown.

The soup is adapted to be heated directly in the can by a pair of heating units 5 which extend outwardly from the front wall of the housing 1. Each heating unit 5 includes a bottom tray or platform 6 which supports the can and is mounted for sliding movement on a pair of pins 8 which extend outwardly from the housing 1 and are received within guideways 7 formed in the bottom surface of the tray 6. As best shown in FIG. 5, the outer end of the tray 6 is provided with an extension 9 which serves as a hand-pull, and the inner end of the tray is straight and bears against the wall of the housing 1.

Each heating unit 5 includes a fixed clamping member 11 and movable clamping member 12 which is movable from an open to a closed position. The fixed clamping member 11 includes a generally curved side wall 14, a top wall 15 and a bottom wall 16. Side wall 14 is secured to the housing 1 by a pair of screws.

The movable clamping member 12 is similar in construction to the fixed clamping member 11 and includes a generally curved side wall 17, a top wall 18 and a bottom wall 19.

The movable clamping member 12 is pivotally connected by a vertical pin 20 to ears 21 which extend outwardly from the walls 15 and 16 of the fixed clamping member 11.

The inner end of the movable clamping member 12 projects inwardly through an opening 22 in housing 1 and the clamping member 12 is urged to the open position by a spring 23 which is connected between the side wall 17 of clamping member 12 and a pin 24 extending upwardly from the bottom of the housing 1. The force of the spring 23 acts to pivot the movable clamping member 12 about pin 20 to the open position, as shown in FIG. 2.

The clamping members 11 and 12 are locked together by a toggle mechanism which includes a pair of toggle links 25 and 26. Link 25 is pivotally connected to the fixed clamping member 11 while link 26 is pivotally connected to the movable clamping member 12. The toggle links 25 and 26 are shown in the open position in FIG. 2 and by moving the link 26 inwardly toward the housing 1 the links are moved to the closed, over-center position, as shown in FIG. 3. In this over-center position, the toggle links serve to maintain the clamping members 11 and 12 in the closed position.

A generally semi-cylindrical jaw 27 is carried by the fixed clamping member 11 and a similar jaw 28 is carried by the movable clamping member 12. When the clamping members are in the closed position, the jaws 27 and 28 are in engagement with the side wall of a can 29 containing soup or other food material to be heated.

The jaw or shoe 27 is supported from the clamping member 11 by a stud 30. The enlarged head of the stud is located within a recess in boss 31 on member 11 and the end of the stud is threaded in an opening in jaw 27. To minimize heat transfer outwardly to the clamping member 11, an insulating washer 32 is disposed around the central portion of stud 30 and separates jaw 27 and member 11.

The jaw or shoe 28 is supported from the clamping member 12 in a similar manner, but is urged or biased inwardly against the outer surface of the can 29. The enlarged head 33 of a stud 34 is located within a recess in a boss 35 on clamping member 12 and the inner end of stud 33 is threaded in an opening in jaw 28. The jaw 28 is urged inwardly toward can 29 by a spring 36 which is positioned around boss 35 and bears against a washer 37 and the washer in turn bears against the jaw 28. With this construction, the spring 36 urges the jaw 28 inwardly against the surface of the can to provide a tight engagement with the can, even though the can may be dented or out of round.

To heat the can 29 and the soup therein, a pair of electrical heating elements 38 are embedded within the jaws 27 and 28. The elements 38 extend inwardly through the opening 22 in the housing 1 and are connected to suitable electrical leads not shown.

The opened can of soup is placed on the tray 6, shown in FIG. 4. The jaws 27 and 28 are spaced upwardly from the tray 6 a distance slightly greater than the height of the lower bead 39 on the can. This enables the jaws to be in tight engagement with the outer cylindrical wall of the can while the bead 39 extends within the space 40 or clearance between the jaws 27 and 28 and the tray 6.

To open the jaws after the heating operation has been completed, a rod 41 is mounted for sliding movement within aligned openings in the clamping member 11 and the inner end of the rod 41 is connected to a solenoid 42. The rod 41 is biased inwardly by a spring 43 which is interposed between the wall of the housing 1 and a collar 44 located on the rod 41. When the heating cycle is completed, the solenoid is energized to move the rod outwardly, and the outer end of the rod engages the toggle link mechanism to move the links 25 and 26 to the open position, as shown in FIG. 2. This moves the clamping jaw 28 out of contact with the surface of the can 29 and prevents overheating of the contents of the can.

As the opening movement of the movable clamping member 12 is sudden and fast, a provision is made to dampen or decelerate this opening movement. A resilient rubber wedge 45 is secured to the top wall 46 of housing 1 and is positioned so that the edge of the side wall 17 of clamping member 12 will ride up the side edge 47 of wedge 45 as the clamping member 12 is moved to the open position. The wedging contact of the side wall 17 with the resilient wedge 45 dampens the opening movement of the clamping member so that the clamping member will slowly decelerate and this will prevent spilling or splashing of the soup from the can 29.

The heating apparatus of the invention includes a pair of thermostats 48 and 49 which are secured to the jaws 27 and 28, respectively. The thermostat 48 is a conventional bi-metallic element which serves to prevent overheating of the soup. The normally closed thermostat 48 is set for a temperature of about 375° F. If the temperature should rise above this setting, the thermostatic switch 48 will open to thereby shut off the electrical power to the heating elements 38.

As the can 29 will normally have a paper label on its outer surface, the setting of thermostat 48 should be less than the charring temperature of paper so that the label will not burn.

The thermostat 49 is similar in construction to thermostat 48 and provides a delay in the timing cycle so that the contents of the can 29 will always be heated to the uniform temperature. The thermostat 49 is normally open and is set for a temperature of approximately 150° F. When the jaw 28 has reached this temperature setting, the thermostat 49 will close to thereby start the timing cycle. The thermostat 49 insures that the contents of the can will be heated to a uniform temperature at all times. Without the delay thermostat 49, the heating cycle would normally continue for the period of time set by the timing device. If the heating unit was cold when the timing cycle was started, the contents would obviously not be heated to the same temperature as if the heating unit was warm when the timing cycle was started. The thermostat 49 eliminates this problem and insures that the timing cycle will not begin until the heating unit is at the pre-set temperature.

A main on-off switch 50 is secured to the top wall 46 of the housing 1 and is adapted to be engaged and closed by the movable clamping member 12 when the clamping member is moved to the closed position.

The heating cycle is controlled by a known type of timing mechanism indicated generally by 51 which is mounted within the housing 1. A pointer or control knob 52 is located on the outside of the housing 1 and serves to set the desired time cycle for heating. The timer 51 is set manually by turning the knob 52 in one direction and is moved in the opposite direction to an "off" position by electric means, such as a motor.

FIG. 6 illustrates a schematic wiring diagram for the heating apparatus of the invention. The main on-off switch 50 is connected in power line 53 in series with a single-pole, double-throw timer switch 54 which includes a contact arm 55 selectively engageable with contacts 56 and 57. Contact 56 of timer switch 54 is connected to one side of the solenoid 42 while the other side of the solenoid is connected to power line 58. The other contact 57 of timer switch 54 is connected in series with the high limit thermostat 48 and the electric heating element 38. In addition, the timer motor 59 and the delay thermostat 49 are connected in parallel with the thermostat 48 and heating element 38.

At the start of the operation, the main switch 50 is in the open position and the timer switch arm 54 is connected through contact 56. The delay thermostatic switch 49 is open and the high temperature limit thermostatic switch 48 is closed.

After the top has been removed from the can 29, the can is placed on the tray 6 between the open jaws 27 and 28. The toggle mechanism is then closed so that the jaws 27 and 28 are brought into tight heat conductive relation with the can 29. Closing the movable clamping member 12 serves to manually close the switch 50.

The timer pointer 52 is then turned to the desired period of heating and this throws the timer switch arm 54 into engagement with the contact 57 to thereby energize the heating element 38. When the delay thermostat 49 reaches its setting, it will close thereby energizing the timer motor 59 to start the timing cycle.

At the end of the timing cycle the timer switch arm 54 will break contact with contact 57 and make contact with the contact 56. This opens the circuit to the heating element 38 to stop the heating and also energizes the solenoid 42 to thereby move the rod 41 outwardly and open the toggle mechanism.

When the clamping member 12 is opened by the solenoid actuated rod 41, the clamping member will ride against the resilient wedge 45 to frictionally retard or dampen the opening movement so that the contents of the can 29 will not splash or spill as the jaw is opened. When the jaw 28 is in the open position, as shown in FIG. 2, the residual heat within the jaws will not overheat or boil the contents of the can, but instead will merely serve to keep the contents of the can 29 warm.

The heating apparatus of the invention enables the contents of the can to be heated directly in the can without having to transfer the soup or other food product to a heating cup. This eliminates the necessity of washing the separate heating cup and insures that the flavor of the soup will not be contaminated. In addition, heating the soup in the can in which it is processed and shipped also provides sanitary advantages over the use of a separate heating cup or container.

The spring 33 enables the heated jaws 27 and 28 to apply a constant and uniform pressure against the side of the can regardless of surface variations or out-of-roundness of the can. This increases the rate and uniformity of heating.

The invention includes a pair of thermostats which aid in controlling the heating cycle. The high limit thermostat 48 prevents overheating and is set at a temperature sufficiently low so that the label on the can will not burn or char. In addition, the delay thermostat 49 enables the contents of the can to be heated to a uniform temperature and delays the timing cycle until the temperature of the heating jaws 27 and 28 is at the pre-set value.

At the end of the heating cycle, not only is the heating element de-energized, but the jaws are opened so that the residual heat in the jaws will not cause the contents to be overheated or boiled. In the open position, the clamping jaws 27 and 28 are not in contact with the can but are in close proximity to the can so that the contents of the can will remain warm even though the can is not removed from the unit for a period of time.

It may be desirable to apply a coating of a release agent to the inner surface of the jaws 27 and 28. In some cases, the paper label on the can 29 may be coated with varnish or other protective materials, and during heating, the varnish may become tacky which will prevent the jaws from freely disengaging the can when the jaws are opened. By applying a coating of polytetrafluoroethylene (Teflon) or an organosilicon oxide polymer, in which the structural unit is —$R_2Si$—O— and where R is a monovalent organic radical, commonly called silicones, sticking of the can to the jaws can be prevented.

Various modes of carrying out the invention are contemplated as being within the scope of the following claims particularly pointing out and distinctly claiming the subject matter which is regarded as the invention.

We claim:

1. An apparatus for heating a food product in a can having a bottom and a side wall, comprising a supporting structure including a generally horizontal support member to support the can to be heated, a pair of clamping members mounted on the supporting structure above the support member, means for mounting a first of said clamping members for relative movement with respect to the second of said clamping members with said first clamping member being movable from an open can-receiving position to a closed can-clamping position, a heating member associated with each clamping member and adapted to engage the outer surface of the can when the clamping members are in the closed position to thereby heat the can and the product therein, means for automatically moving the said first clamping member to the open position at the completion of a preselected heating period, and resilient means disposed to be engaged by said first clamping member as said first clamping member moves to the open position to dampen the movement thereof and prevent splashing of the product from the can.

2. The structure of claim 1 in which the resilient means is secured to the supporting structure and has a surface disposed to be wedgingly engaged by a portion of the first clamping member as said first clamping member moves to the open position.

References Cited by the Examiner

UNITED STATES PATENTS

| | | | |
|---|---|---|---|
| 1,316,190 | 9/1919 | Sackerman | 219—535 |
| 1,678,885 | 7/1928 | Thomas | 219—441 |
| 1,702,480 | 2/1929 | Newson | 219—441 |
| 2,070,290 | 2/1937 | McCullough | 99—333 |
| 2,614,480 | 10/1952 | Elmer | 219—535 |
| 2,725,457 | 11/1955 | Norton | 219—535 |
| 2,992,314 | 7/1961 | Drugmand et al. | 219—535 |

RICHARD M. WOOD, *Primary Examiner.*

C. L. ALBRITTON, *Assistant Examiner.*